(12) United States Patent
Kronz

(10) Patent No.: US 11,607,705 B2
(45) Date of Patent: Mar. 21, 2023

(54) AIR PURGING APPARATUS FOR A COATER

(71) Applicant: Michael Kronz, Verona, WI (US)

(72) Inventor: Michael Kronz, Verona, WI (US)

(*) Notice: Subject to any disclaimer, the term of this patent is extended or adjusted under 35 U.S.C. 154(b) by 112 days.

(21) Appl. No.: 16/930,618

(22) Filed: Jul. 16, 2020

(65) Prior Publication Data
US 2021/0162447 A1 Jun. 3, 2021

Related U.S. Application Data

(63) Continuation-in-part of application No. 15/499,874, filed on Apr. 27, 2017, now Pat. No. 10,913,082.
(Continued)

(51) Int. Cl.
*B05C 7/08* (2006.01)
*B05B 15/55* (2018.01)
(Continued)

(52) U.S. Cl.
CPC .............. *B05C 7/08* (2013.01); *B05B 3/1014* (2013.01); *B05B 7/0408* (2013.01);
(Continued)

(58) Field of Classification Search
CPC ........... B05C 7/02; B05C 7/08; B05B 3/1014; B05B 13/0636; B05B 7/0408;
(Continued)

(56) References Cited

U.S. PATENT DOCUMENTS 3,034,729 A * 5/1962 Gray ..................... B05D 7/222
118/DIG. 10
3,147,924 A * 9/1964 Schulze ................ E01C 19/105
239/404
(Continued)

FOREIGN PATENT DOCUMENTS

EP 0233384 * 8/1987
EP 2230021 * 9/2010

*Primary Examiner* — Laura Edwards
(74) *Attorney, Agent, or Firm* — David J. Archer

(57) ABSTRACT

An air purging coater apparatus is disclosed for purging mixed components from the apparatus disposed in a pipeline at a pipeline site. The apparatus includes a remote-controlled apparatus for insertion within the pipeline at the pipeline site. The remote-controlled apparatus includes a drive for controllably moving the remote-controlled apparatus internally within the pipeline. A high-pressure mixing device defines a first and second inlet controllably connected to a pressurized and further pressurized source respectively of a first and second component. The high-pressure mixing device defines a high-pressure mixing chamber connected to the first and the second inlets for mixing together the first and second components. The high-pressure mixing device defines an outlet connected to the high-pressure mixing chamber for receiving a flow therethrough of the mixed components. A spin head defines an internal conical surface
(Continued)

and a baffle so that the mixed components are applied to an inside surface of the pipeline. The high-pressure mixing device is controllably movable from an application disposition thereof to a purging disposition. In the purging disposition, the flow of the mixed components is terminated and a source of pressurized air flows into and through the first and second inlets and the high-pressure mixing chamber and the outlet for purging any residual mixed components from the high-pressure mixing device thereby avoiding any need for the use of a potentially hazardous solvent.

10 Claims, 12 Drawing Sheets

Related U.S. Application Data

(60) Provisional application No. 62/330,047, filed on Apr. 29, 2016.

(51) Int. Cl.
| | | |
|---|---|---|
| *F16L 55/32* | (2006.01) | |
| *F16L 58/02* | (2006.01) | |
| *B05C 7/02* | (2006.01) | |
| *F16L 55/26* | (2006.01) | |
| *F16L 55/162* | (2006.01) | |
| *B05B 3/10* | (2006.01) | |
| *B05B 13/06* | (2006.01) | |
| *B05B 7/04* | (2006.01) | |
| *F16L 101/16* | (2006.01) | |
| *B05D 7/22* | (2006.01) | |

(52) U.S. Cl.
CPC .......... *B05B 13/0636* (2013.01); *B05B 15/55* (2018.02); *B05C 7/02* (2013.01); *B05D 7/225* (2013.01); *F16L 55/162* (2013.01); *F16L 55/26* (2013.01); *F16L 55/32* (2013.01); *F16L 58/02* (2013.01); *F16L 2101/16* (2013.01)

(58) Field of Classification Search
CPC .......... B05B 1/306; F16L 55/32; F16L 58/02; F16L 2101/16; F16L 55/1645; F16L 55/162; F16L 55/26; B05D 7/225; B05D 1/02; B05D 2254/04; Y10S 118/10
USPC .......................................................... 118/317
See application file for complete search history.

(56) References Cited

U.S. PATENT DOCUMENTS

| | | | | |
|---|---|---|---|---|
| 3,233,580 | A * | 2/1966 | Levake | B05B 3/1014 |
| | | | | 118/317 |
| 3,327,681 | A * | 6/1967 | Hortvet | B05B 13/0636 |
| | | | | 118/712 |
| 3,460,988 | A * | 8/1969 | Dineen | B05B 7/066 |
| | | | | 134/1 |
| 3,799,403 | A * | 3/1974 | Probst | B05B 7/2497 |
| | | | | 239/414 |
| 3,930,061 | A * | 12/1975 | Scharfenberger | B29C 41/006 |
| | | | | 264/483 |
| 4,211,367 | A * | 7/1980 | Allison | B05B 3/001 |
| | | | | 239/246 |
| 4,216,738 | A * | 8/1980 | Muta | F16L 55/18 |
| | | | | 118/317 |
| 4,405,086 | A * | 9/1983 | Vetter | B05B 3/1064 |
| | | | | 239/224 |
| 5,181,962 | A * | 1/1993 | Hart | B05B 13/0636 |
| | | | | 118/317 |
| 6,745,955 | B2 * | 6/2004 | Kronz | B05B 13/0636 |
| | | | | 239/243 |
| 7,137,573 | B2 * | 11/2006 | Murai | B05B 3/1064 |
| | | | | 239/452 |
| 7,527,172 | B2 * | 5/2009 | McMichael | B05B 7/1209 |
| | | | | 222/145.5 |
| 9,180,469 | B2 * | 11/2015 | Nolte | B05B 5/0422 |
| 9,393,531 | B2 * | 7/2016 | Hiemer | B05B 7/0861 |
| 2011/0244125 | A1 * | 10/2011 | Weisenberg | C08G 18/5021 |
| | | | | 427/236 |
| 2014/0251206 | A1 * | 9/2014 | Kim | B05B 13/005 |
| | | | | 118/306 |

\* cited by examiner

AIR PURGING APPARATUS FOR A COATER

CROSS REFERENCE TO RELATED APPLICATIONS

The present application is a Continuation in part application filed pursuant to a co-pending Complete application U.S. Ser. No. 15/499874 filed Apr. 27, 2017, now U.S. Pat. No. 10, 913,082, filed pursuant to Provisional patent application U.S. Ser. No. 62/618363 filed Jan. 17, 2018. All of the disclosure of the aforementioned applications is incorporated herein by reference.

Title: An air purging apparatus for a coater.

Field of the invention

BACKGROUND OF THE INVENTION

The present invention relates to an air purging apparatus for a coater.

More specifically, the present invention relates to an air purging apparatus for a coater for purging mixed components from a pipeline coating apparatus disposed within the pipeline at a pipeline refurbishing or manufacturing site.

Background information.

The present invention relates to an air purging apparatus for a coater for coating an internal surface of a pipeline.

The coater includes a high-pressure mixing device and a spin head. The high-pressure mixing device defines a high-pressure mixing chamber. The arrangement is such that in an application disposition of the high-pressure mixing device, the high-pressure mixing chamber is connected to two components at high pressure such that the components mix and are activated within the high-pressure mixing chamber.

However, when the high-pressure mixing device is moved to a purging disposition, the high-pressure mixing chamber is immediately sealed from the component supplies. Consequently, a source of pressurized air easily purges or blows out the residual activated coating material from the high-pressure mixing device including the high-pressure mixing chamber.

The apparatus includes a coating head defining a conical surface having a first and a second end. The arrangement is such that in use of the apparatus, the conical surface guides the coating material towards the internal surface of the pipe. A motor is selectively connected to an energy source such that when the motor is connected to the energy source, the motor rotates the coating head. The arrangement is such that a ribbon of the coating material flows radially outwardly from the second end of the conical surface towards the internal surface of the pipe.

In the present invention, the conical surface of the coating head or spin head is disposed at a relatively large angle relative to the axis of rotation of the conical surface. For example, the angle may be 45 degrees or more. This results in a rapid flow of coating material along the conical surface. Also, a baffle is disposed adjacent to the upstream or first end of the conical surface so that coating material flowing from the high pressure mixing chamber impinges on the baffle and is deflected by the baffle towards and onto the first end of the conical surface where the coating material rapidly flows towards the second or downstream end of the conical surface. In a preferred embodiment of the present invention, there are no spaced bores defined by the conical surface. Rather, the coating material flows to the second or downstream end of the conical surface where the coating material tends to form a thin radially extending ribbon which is disposed almost normal to the axis of rotation of the conical surface. Such radial curtain tends to strike the internal surface of the pipe in a radial direction substantially normal to the axis of rotation of the conical surface. In the apparatus according to the present invention, a very smooth and thin coating of uniform thickness has been consistently applied. Accordingly, this has resulted in a reduction in the amount of materials used in the coating operation, as well as a predictable consistency.

More specifically, the high-pressure mixing chamber is selectively connected to a supply of a first coating component disposed at a first location adjacent to the high-pressure mixing chamber for selective fluid communication with the high-pressure mixing chamber. Additionally, the high-pressure mixing chamber is also selectively connected to a supply of a second coating component disposed at a second location adjacent to the high-pressure mixing chamber for selective fluid communication with the high-pressure mixing chamber.

A control is connected to the high-pressure mixing device for selectively moving the high-pressure mixing chamber between the application disposition and the purging disposition. The arrangement is such that the first and second coating components simultaneously flow into the high-pressure mixing chamber when the high-pressure mixing chamber is disposed in the application disposition thereof. Also, the first and second coating components are sealed from the high-pressure mixing chamber when the high-pressure mixing chamber is disposed in the purging disposition thereof.

The source of pressurized air is supplied such that in the purging disposition, pressurized air flows through the inlets into the high-pressure mixing chamber so that any residual activated material is blown through and out of the high-pressure mixing chamber through the outlet.

More particularly, the present invention provides a unique apparatus for internally coating pipes including pipes having an inside diameter of 2 inches or greater.

Also, the thin film of coating material on the conical surface is minimal requiring no clean up or solvents during completion of the coating operation. The conical surface spins at about 5000 rpm, so, the buildup of residual coating material on the conical surface is negligible.

Therefore, a primary object of the present invention is the provision of a coater and purging apparatus which coats an internal surface of a pipe including a pipe having an inside diameter of 2 inches or greater.

Another objective of the present invention is the provision of a coater and purging apparatus which reduces the amount of coating material used in a coating operation.

Yet another object of the present invention is the provision of a coater and purging apparatus which avoids the problems associated with a clean-up operation after the completion of a coating operation.

A further object of the present invention is the provision of a coater and purging apparatus which permits an interruption of a coating operation without introducing any need for purging the coating apparatus with solvent.

Other features and advantages of the present invention will be readily apparent to those skilled in the art by a consideration of the detailed description of a preferred embodiment of the present invention contained herein.

SUMMARY OF THE INVENTION

The present invention relates to an air purging and coater apparatus for purging mixed components from a coating apparatus disposed within a pipeline at a pipeline refurbishing or manufacturing site. The apparatus includes a remote-controlled machine for insertion within the pipeline at the pipeline refurbishing or manufacturing site.

The remote-controlled machine includes a drive for controllably moving the remote-controlled machine internally within the pipeline. A high-pressure mixing device defines a first inlet which is controllably connected to a pressurized source of a first component. The high-pressure mixing device also defines a second inlet which is controllably connected to a further pressurized source of a second component. A high-pressure mixing chamber defined by the high-pressure mixing device is connected to the first and second inlets such that the high-pressure mixing chamber mixes the first and second components. The high-pressure mixing device defines an outlet connected to the high-pressure mixing chamber for a flow therethrough of the mixed components.

Also, a spin head defines an internal conical surface which has an apex which cooperates with the outlet of the high-pressure mixing device for receiving the flow of the mixed components. The spin head includes a baffle which is disposed adjacent to the apex such that when the spin head is rotated, the mixed components from the outlet are deflected by the baffle onto the internal conical surface so that the mixed components are applied to an inside surface of the pipeline at the refurbishing or manufacturing site.

The high-pressure mixing device is controllably movable from an application disposition thereof to a purging disposition. The application disposition is such that the first inlet and the second inlet are aligned with and in fluid communication with the respective pressurized source and further pressurized source so that the components flow to the high-pressure mixing chamber and thereafter are applied to the inside surface of the pipeline.

However, when the high-pressure mixing device is controllably moved to the purging disposition, the first and second inlets are moved out of alignment with the pressurized sources so that the flow of the components is terminated. Also, in the purging disposition, a source of pressurized air flows into and through the first and second inlets into the high-pressure mixing chamber and from the high-pressure mixing chamber through the outlet for purging any residual mixed components from the high-pressure mixing chamber thereby avoiding any need for the use of potentially hazardous solvents together with any attendant potentially life threatening conditions that could result from the introduction of such solvents into the pipeline at the pipeline refurbishing or manufacturing site.

In a more specific embodiment of the present invention, the drive selectively moves the remote-controlled machine along the pipeline selectively in a forward direction and a reverse direction.

The remote-controlled machine further includes a housing having a forward extremity and a rearward extremity. The housing defines a bore which extends from the forward extremity to the rearward extremity of the housing for the slidable reception therein of the high-pressure mixing device.

Moreover, the housing defines a cross bore which is disposed normal to the bore. The cross bore has a first side and a second side. The bore is disposed between the first and second sides of the cross bore such that when the high-pressure mixing device is in the application disposition and the purging disposition, the inlets are exposed to the cross bore.

Furthermore, the remote-controlled machine further includes a first coupling secured to the housing adjacent to the first side of the cross bore and a second coupling secured to the housing adjacent to the second side of the cross bore such that the high-pressure mixing device and the cross bore are disposed between the first and second couplings.

A first seal is movably secured to the first coupling and is disposed within the cross bore between the first coupling and the first inlet.

Additionally, a second seal is movably secured to the second coupling and is disposed within the cross bore between the second coupling and the second inlet. The arrangement is such that when the high-pressure mixing device is in the application disposition, the first component flows through the first coupling and then through the first seal into the first inlet. At the same time, the second component flows through the second coupling then through the second seal into the second inlet.

More specifically, the first seal is movably urged axially relative to the first inlet into sealing engagement with the high-pressure mixing device and the aligned first inlet.

Similarly, the second seal is movably urged axially relative to the second inlet into sealing engagement with the high-pressure mixing device and the aligned second inlet.

Additionally, the high-pressure mixing device defines a first planar surface and a second planar surface. The arrangement is such that the first seal slidably engages the first planar surface and the second seal slidably engages the second planar surface when the high-pressure mixing device is moved between the application disposition and the purging disposition.

Also, the remote-controlled machine further includes a first compression spring which is disposed between the first coupling and the first movable seal for urging the first seal axially towards the first inlet.

Moreover, a second compression spring is disposed between the second coupling and the second movable seal for urging the second seal axially towards the second inlet.

Many modifications and variations of the present invention will be readily apparent to those skilled in the art by a consideration of the detailed description contained hereinafter taken in conjunction with the annexed drawings which show a preferred embodiment of the present invention. However, such modifications and variations fall within the spirit and scope of the present invention as defined by the appended claims.

BRIEF DESCRIPTION OF THE DRAWINGS

Similar reference characters refer to similar parts throughout the various Figures of the drawings.

DETAILED DESCRIPTION OF THE DRAWINGS

Figure 1:
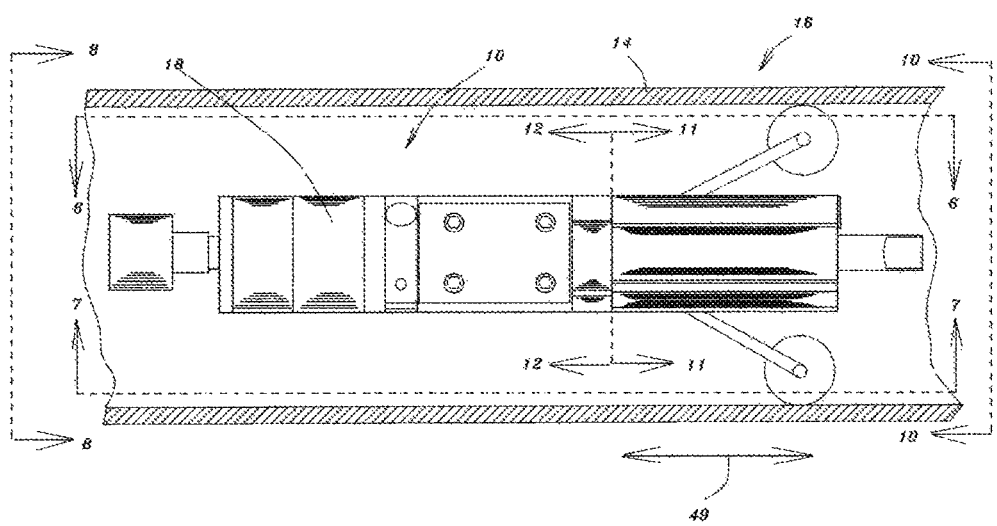
FIG. 1 is a side elevational view of an air purging and coater apparatus according to the present invention.

FIG. 1 is a side elevational view of an air purging and coater apparatus generally designated 10 according to the present invention.

As shown in FIG. 1, the purging and coater apparatus 10 is for coating and then purging mixed and activated residual components 12 from the purging and coater apparatus 10 disposed in a pipeline 14 at a pipeline refurbishing or manufacturing site generally designated 16. The apparatus 10 includes a remote-controlled apparatus 18 for insertion within the pipeline 14 at the pipeline refurbishing or manufacturing site 16.

The remote-controlled apparatus 18 includes a drive 20 for controllably moving the remote-controlled apparatus 18 internally within the pipeline 14.

Figure 2:
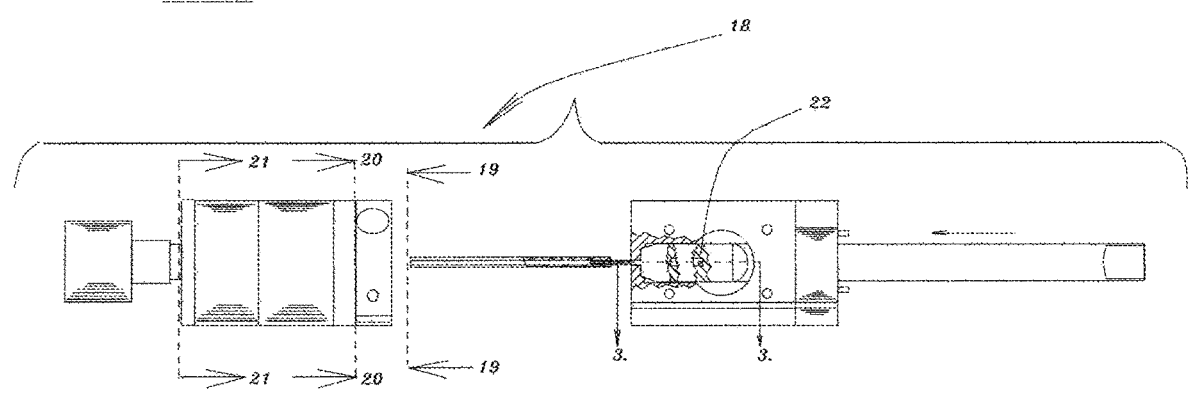
FIG. 2 is an exploded view of the remote-controlled apparatus shown in FIG. 1.

FIG. 2 is an exploded view of the remote-controlled apparatus 18. As shown in FIG. 2, the remote-controlled apparatus 18 includes a high-pressure mixing device generally designated 22.

In the present disclosure and claims, the term "high-pressure mixing device" is to be understood as meaning a mixing device in which the "high-pressure" is in the range 1500-3500 psi.

Figure 3:
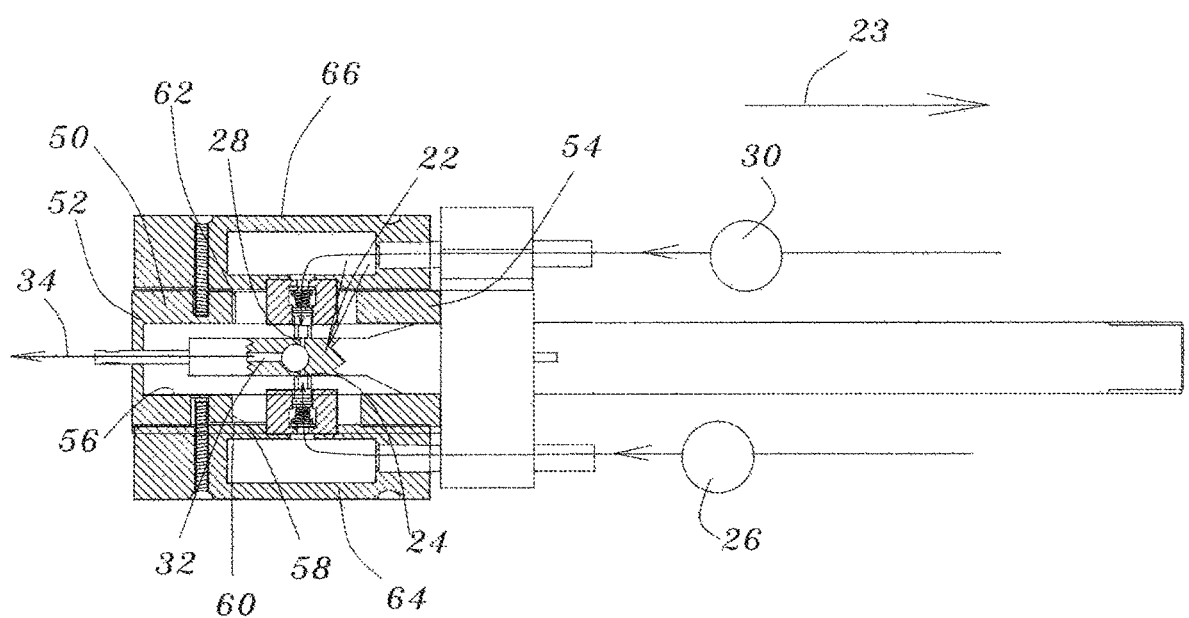
FIG. 3 is a sectional view taken on the line 3-3 of FIG. 2 and shows the apparatus in the application disposition.

FIG. 3 is a sectional view taken on the line 3-3 of FIG. 2. As shown in FIG. 3, the high-pressure mixing device 22 defines a first inlet 24 which is controllably connected to a pressurized source of a first component 26. The high-pressure mixing device 22 also defines a second inlet 28 which is controllably connected to a further pressurized source of a second component 30. The first and second inlets 24 and 28 are selectively connected to a high-pressure mixing chamber 31 for mixing the first and second components together in the high-pressure mixing chamber 31. The high-pressure mixing device 22 also defines an outlet 32 connected to the high-pressure mixing chamber 31 for receiving a flow therethrough of the mixed components 12 as indicated by the arrow 34.

In the present disclosure and claims, the term "high-pressure mixing chamber" is to be understood as meaning a mixing chamber in which the "high-pressure" is in the range 1500-3500 psi.

Figure 4:
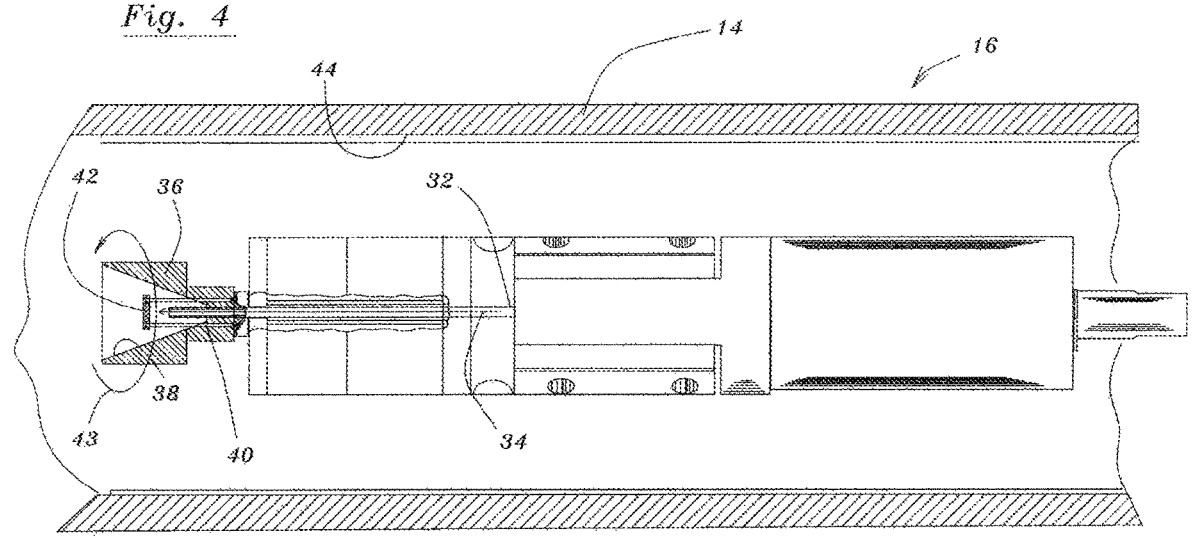
FIG. 4 is a similar view to that shown in FIG. 1 but is partially in section.

FIG. 4 is a similar view to that shown in FIG. 1 but is partially in section. As shown in FIG. 4, a spin head 36 defines an internal conical surface 38 which has an apex 40 which cooperates with the outlet 32 of the high-pressure mixing device 22 for receiving the flow 34 of the mixed components. The spin head 36 includes a baffle 42 which is disposed adjacent to the apex 40 such that when the spin head 36 is rotated, as indicated by the arrow 43, the mixed components are deflected by the baffle 42 onto the internal conical surface 38 so that the mixed components are applied to an inside surface 44 of the pipeline 14 at the refurbishing or manufacturing site 16.

The high-pressure mixing device 22 is controllably movable as indicated by arrow 23 from an application disposition thereof as shown in FIG. 3 to a purging disposition. As shown in FIG. 3, in the application disposition, the arrangement is such that the first inlet 24 and the second inlet 28 are aligned with and in fluid communication with the respective pressurized source and further pressurized source 26 and 30 respectively so that the mixed components are applied to the inside surface 44 of the pipeline 14 as shown in FIG. 4.

Figure 5:
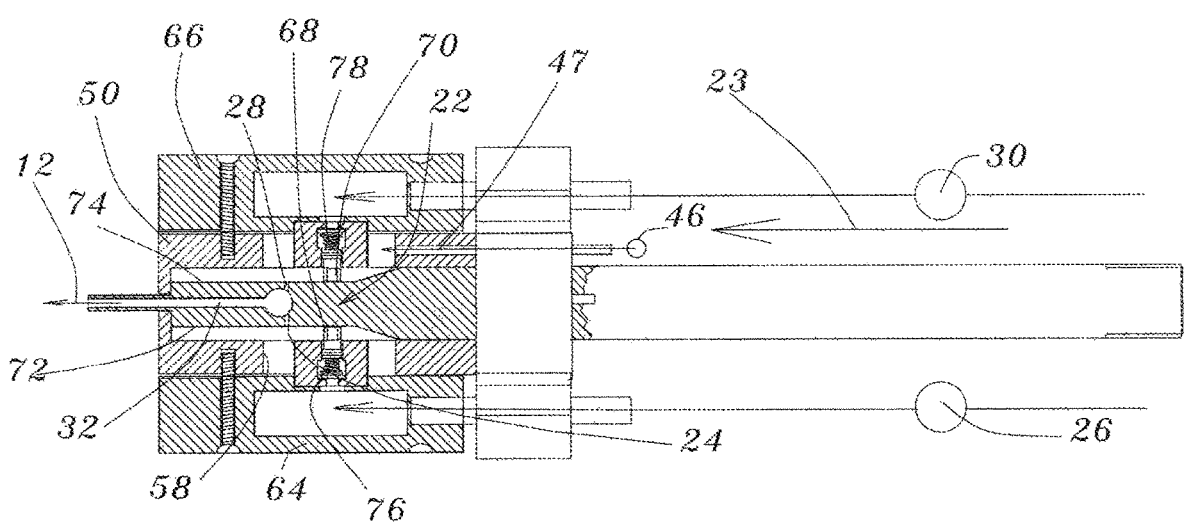
FIG. 5 is a similar view to that shown in FIG. 3 but shows the high-pressure mixing device slidably moved to the left to the purging disposition thereof.

FIG. 5 is a similar view to that shown in FIG. 3 but shows the high-pressure mixing device 22 slidably moved to the left to the purging disposition thereof. As shown in FIG. 5, when the high-pressure mixing device 22 is controllably moved to the left to the purging disposition, the first and second inlets 24 and 28 respectively are moved out of alignment with the pressurized sources 26 and 30 respectively so that the flow of the mixed components 34 is terminated. Also, in the purging disposition as shown in FIG. 5, a source of pressurized air 46 flows as indicated by the arrow 47 into and through the first and second inlets 24 and 28 respectively and from the inlets 24 and 28 respectively through the high-pressure mixing chamber 31 and then through the outlet 32 for purging any residual mixed components 12 from the high-pressure mixing device 22 thereby avoiding any need for the use of a potentially hazardous solvent together with any attendant potentially life threatening conditions that could result from the introduction of such solvent into the pipeline 14 at the pipeline refurbishing or manufacturing site 16.

As shown in FIG. 1, in a more specific embodiment of the present invention, the drive 20 selectively moves the remote-controlled apparatus 18 through the pipeline 14 in a forward direction and a reverse direction as indicated by the arrow 49.

As shown in FIGS. 3 and 5, the remote-controlled apparatus 18 further includes a housing 50 having a forward extremity 52 and a rearward extremity 54. The housing 50 defines a bore 56 which extends from the forward extremity 52 to the rearward extremity 54 for the slidable reception therein of the high-pressure mixing device 22.

Moreover, the housing 50 defines a cross bore 58 which is disposed normal to the bore 56. The cross bore 58 has a first side 60 and a second side 62. The bore 56 is disposed between the first and second sides 60 and 62 respectively of the cross bore 58 such that when the high-pressure mixing device 22 is in either the application disposition or the purging disposition, the inlets 24 and 28 respectively are disposed within the cross bore 58.

Furthermore, the remote-controlled apparatus 18 further includes a first coupling 64 secured to the housing 50 adjacent to the first side 60 of the cross bore 58. A second coupling 66 is secured to the housing 50 adjacent to the second side 62 of the cross bore 58 such that the high-pressure mixing device 22 and the cross bore 58 are disposed between the first and second couplings 64 and 66 respectively as shown in FIG. 3.

As shown in FIG. 5, a first seal 68 is movably secured to the first coupling 64 and is disposed within the cross bore 58 between the first coupling 64 and the first inlet 24.

Additionally, a second seal 70 is movably secured to the second coupling 66 and is disposed within the cross bore 58 between the second coupling 66 and the second inlet 28. The arrangement is such that when the high-pressure mixing device 22 is in the application disposition as shown in FIG. 3, the first component flows through the first coupling 64 and then through the first seal 68 into the first inlet 24. At the same time, the second component flows through the second coupling 66 then through the second seal 70 into the second inlet 28.

More specifically, the first seal 68 is movably urged axially relative to the first inlet 24 into sealing engagement with the high-pressure mixing device 22 and the aligned first inlet 24 as shown in FIG. 3.

Similarly, the second seal 70 is movably urged axially relative to the second inlet 28 into sealing engagement with the high-pressure mixing device 22 and the aligned second inlet 28 as shown in FIG. 3.

Additionally, as shown in FIG. 5, the high-pressure mixing device 22 defines a first planar surface 72 and a second planar surface 74. The arrangement is such that the first seal 68 slidably engages the first planar surface 72 and the second seal 70 slidably engages the second planar surface 74 when the high-pressure mixing device 22 is moved between the application disposition shown in FIG. 3 and the purging disposition shown in FIG. 5.

Also, as shown in FIG. 3, the remote-controlled apparatus 18 further includes a first compression spring 76 which is disposed between the first coupling 64 and the first movable seal 68 for urging the first seal 68 axially towards the first inlet 24 and the first planar surface 72 when in the application disposition.

Moreover, a second compression spring 78 is disposed between the second coupling 66 and the second movable seal 70 for urging the second seal 70 axially towards the second inlet 28 and the second planar surface 74.

As shown in FIG. 5, the forward extremity 52 of the housing 50 sealingly cooperates with the outlet 32 of the high-pressure mixing device 22 when the high-pressure mixing device is in the purging disposition thereof. Therefore, the flow of pressurized air from the source of pressurized air 46 will flow through inlets 24 and 28 though the high-pressure mixing chamber 31 and the outlet 32 for purging activated material from the high-pressure mixing device 22.

Figure 6:
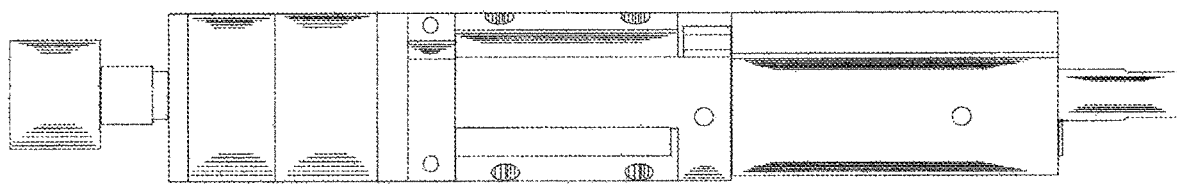
FIG. 6 is a view taken on the line 6-6 shown in FIG. 1.
Figure 7:
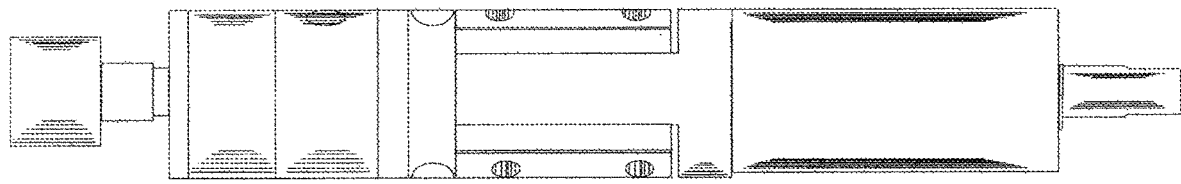
FIG. 7 is a view taken on the line 7-7 shown in FIG. 1.
Figure 8:
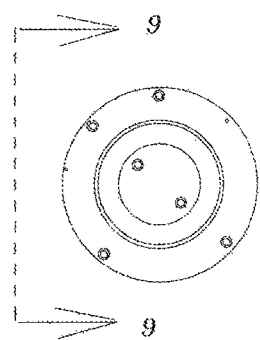
FIG. 8 is a view taken on the line 8-8 shown in FIG. 1.
Figure 9:
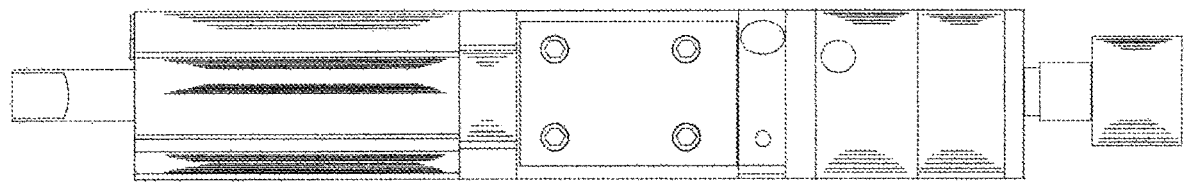
FIG. 9 is a view taken on the line 9-9 shown in FIG. 8.
Figure 10:
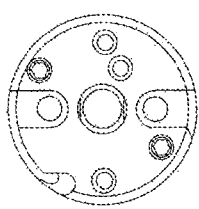
FIG. 10 is a view taken on the line 10-10 shown in FIG. 1.
Figure 11:
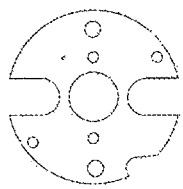
FIG. 11 is a view taken on the line 11-11 shown in FIG. 1.
Figure 12:
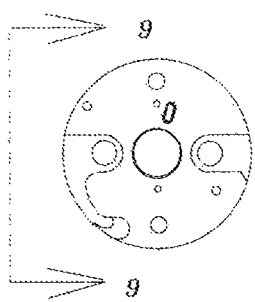
FIG. 12 is a view taken on the line 12-12 shown in FIG. 1.
Figure 13:
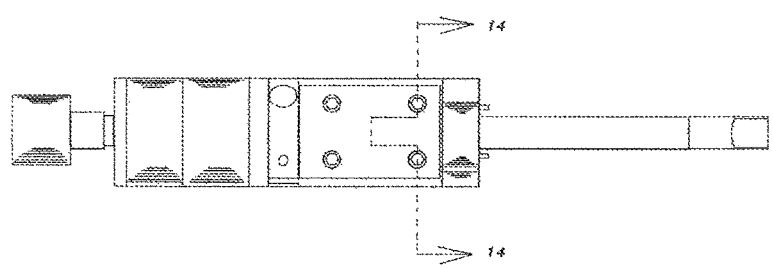
FIG. 13 is an enlarged view of the remote-controlled machine shown in FIG. 1.
Figure 14:
FIG. 14 is a view taken on the line 14-14 shown in FIG. 13.

FIG. 6 is a view taken on the line 6-6 shown in FIG. 1.
FIG. 7 is a view taken on the line 7-7 shown in FIG. 1.
FIG. 8 is a view taken on the line 8-8 shown in FIG. 1.
FIG. 9 is a view taken on the line 9-9 shown in FIG. 8.
FIG. 10 is a view taken on the line 10-10 shown in FIG. 1.
FIG. 11 is a view taken on the line 11-11 shown in FIG. 1.
FIG. 12 is a view taken on the line 12-12 shown in FIG. 1.
FIG. 13 is an enlarged view of the remote-controlled apparatus shown in FIG. 1.
FIG. 14 is a view taken on the line 14-14 shown in FIG. 13.

Figure 15:
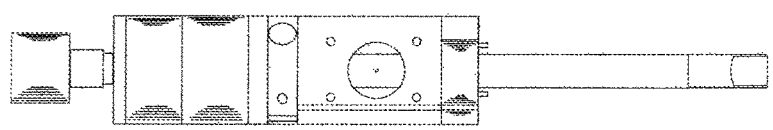
FIG. 15 is a similar view to that shown in FIG. 14 but with the first coupling removed to show the high-pressure mixing device in the application disposition.
Figure 16:
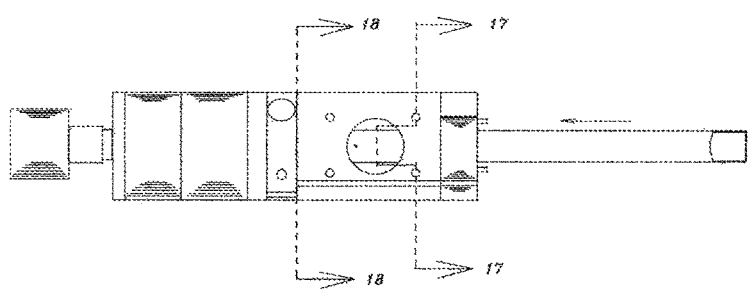
FIG. 16 is a similar view to that shown in FIG. 15 but shows the high-pressure mixing device in the purging disposition.
Figure 17:
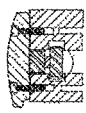
FIG. 17 is a view taken on the line 17-17 shown in FIG. 16.
Figure 18:
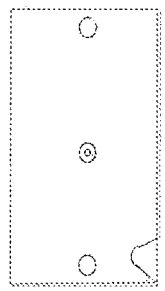
FIG. 18 is a view taken on the line 18-18 shown in FIG. 16.
Figure 19:
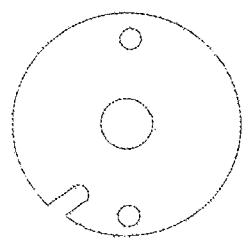
FIG. 19 is a view taken on the line 19-19 shown in FIG. 2.
Figure 20:
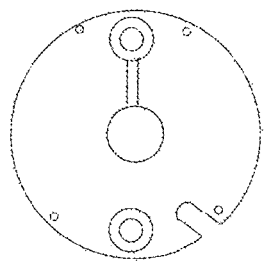
FIG. 20 is a view taken on the line 20-20 shown in FIG. 2.
Figure 21:
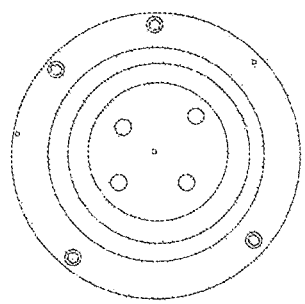
FIG. 21 is a view taken on the line 21-21 shown in FIG. 2.

FIG. 15 is a similar view to that shown in FIG. 14 but with the first coupling removed to show the high-pressure mixing device in the application disposition.
FIG. 16 is a similar view to that shown in FIG. 15 but shows the high-pressure mixing device in the purging disposition.
FIG. 17 is a view taken on the line 17-17 shown in FIG. 16.
FIG. 18 is a view taken on the line 18-18 shown in FIG. 16.
FIG. 19 is a view taken on the line 19-19 shown in FIG. 2.
FIG. 20 is a view taken on the line 20-20 shown in FIG. 2; and
FIG. 21 is a view taken on the line 21-21 shown in FIG. 2.

In operation of the air purging coater apparatus 10 according to the present invention, the apparatus 10 is inserted into the pipeline 14. The apparatus 10 which includes the remote-controlled apparatus 18 has a drive 20 which enables the apparatus 10 to be remotely controlled and moved along and within the pipeline 14 at the pipeline refurbishing or manufacturing site 16. With the high-pressure mixing device 22 remotely moved to the application disposition as shown in FIG. 3, the first component from the pressurized source of the first component 26 flows through the first inlet 24 of the high-pressure mixing device 22. Additionally, the second component from the further pressurized source of the second component 30 flows through the second inlet 28 of the high-pressure mixing device 22. The first and second components under high-pressure are mixed together in the high-pressure mixing chamber 31 of the high-pressure mixing device 22. The mixed components then flow from the high-pressure mixing chamber 31 through the outlet 32. At the same time, the drive 20 is remotely energized to drive the apparatus forward through the pipeline 14 at a remotely controlled speed. Also, at the same time, the motor for rotating the spin head 36 is energized remotely at a controlled rate of rotation. The arrangement is such that the mixed and consequently activated components flow from the outlet 32 of the high-pressure mixing device 22 to the baffle 42 of the spin head 36 where the activated components are deflected onto the inside surface 44 of the spin head 36 for application of the mixed activated components onto the inside surface 44 of the pipeline 14.

When the coating of the inside surface 44 of the pipeline 14 has been completed, the high-pressure mixing device 22 is moved by remote control so that the high-pressure mixing device 22 slides within the bore 56 of the housing 50 from the application disposition as shown in FIG. 3 to the purging disposition shown in FIG. 5. Consequently, in the air purging disposition shown in FIG. 5, the first and second inlets 24 and 28 are cut off from the high-pressure components. More particularly, the first and second inlets 24 and 28 move to the left as shown in FIG. 5 as indicated by the arrow 23. The outlet 32 cooperates with and seals against the forward extremity 52 of the housing 50 so that pressurized air from the source of pressurized air 46 flows through the inlets 24 and 28 and the high-pressure mixing chamber 31 for purging or blowing out any residual activated mixed components 12 through the outlet 32. By this air purging arrangement according to the present invention, it has been noticed that the continued application of activated components to the internal surface of the pipeline 14 can be interrupted without any need for withdrawal of the apparatus from the pipeline. Also, according to the present invention, the use of flammable solvents and the like is completely avoided thereby providing a purging and coater apparatus that can be safely and efficiently operated in the confined space within the pipeline 14 to be internally coated.

Those skilled in the art will appreciate that there are many variations of the inventive concept of the present invention.

Additionally, those skilled in the art will appreciate that the present invention includes the provision of an arrangement where a plurality of pipes of a standard length can be fed towards the purging and coater apparatus for coating the internal surfaces of such pipes.

The present invention provides a unique arrangement for mixing and thereby activating two components to form a coating material for application to an internal surface of a pipe having an inside diameter of 2 inches or greater.

I claim:

1. An air purging coater apparatus for purging mixed components from the apparatus disposed in a pipeline at a pipeline site, said apparatus comprising:
 a remote-controlled apparatus for insertion within the pipeline at the pipeline site;
 said remote-controlled apparatus including:
 a drive for controllably moving said remote-controlled apparatus internally within the pipeline;
 a high-pressure mixing device in the range 1500-3500 psi defining a first inlet controllably connected to a pressurized source of a first component, said high-pressure mixing device also defining a second inlet controllably connected to a further pressurized source of a second component, said high-pressure mixing device defining a high pressure mixing chamber in the range 1500-3500 psi connected to said first and said second inlets for mixing together the first and second components, said high-pressure mixing device defining an outlet connected to said high pressure mixing chamber for receiving a flow therethrough of the mixed components;
 a spin head defining an internal conical surface having an apex which cooperates with said outlet of said high-pressure mixing device for receiving the flow of the mixed components;
 said spin head including:
 a baffle disposed adjacent to said apex such that when said spin head is rotated, the mixed components are deflected by said baffle onto said internal conical surface so that the mixed components are applied to an inside surface of the pipeline at the pipeline site; and
 said high-pressure mixing device being controllably movable from an application disposition thereof to a purging disposition, said application disposition being such that said first inlet and said second inlet are aligned with and in fluid communication with the respective pressurized source and further pressurized source so that the mixed components are applied to the inside surface of the pipeline, and when said high-pressure mixing device is controllably moved to said purging disposition, said first and second inlets are moved out of alignment with said pressurized sources so that the flow of the mixed components is terminated and a source of pressurized air flows into and through said first and second inlets and from said inlets through said high-pressure mixing chamber and said outlet for purging any residual mixed components from said high-pressure mixing device thereby avoiding any need for the use of a potentially hazardous solvent together with life threatening conditions that could result from the introduction of such solvent into the pipeline at the pipeline site.

2. An air purging apparatus as set forth in claim 1 wherein said drive configured to selectively move the remote-controlled machine along the pipeline in a forward direction and a reverse direction.

3. An air purging apparatus as set forth in claim 1 wherein said remote-controlled apparatus further includes:
 a housing having a forward extremity and a rearward extremity, said housing defining a bore which extends from said forward extremity to said rearward extremity for permitting a slidable reception therein of said high-pressure mixing device.

4. An air purging apparatus as set forth in claim 3 wherein said housing defines a cross bore disposed normal to said bore, said cross bore having a first side and a second side, said bore being disposed between said first and second sides of said cross bore such that when said high-pressure mixing device is in said application disposition and said purging disposition, said inlets are disposed within said cross bore.

5. An air purging apparatus as set forth in claim 4 wherein said remote-controlled apparatus further includes:
 a first coupling secured to said housing adjacent to said first side of said cross bore;
 a second coupling secured to said housing adjacent to said second side of said cross bore such that said high-pressure mixing device and said cross bore are disposed between said first and second couplings;
 a first seal movably secured to said first coupling and disposed within said cross bore between said first coupling and said first inlet;
 a second seal movably secured to said second coupling and disposed within said cross bore between said second coupling and said second inlet such that when said high-pressure mixing device is in said application disposition, the first component flows through said first coupling then through said first seal into said first inlet and the second component flows through said second coupling then through said second seal into said second inlet.

6. An air purging apparatus as set forth in claim 5 wherein said first seal is movably urged axially relative to said first inlet into sealing engagement with said high-pressure mixing device and said aligned first inlet;
 said second seal is movably urged axially relative to said second inlet into sealing engagement with said high-pressure mixing device and said aligned second inlet.

7. An air purging apparatus as set forth in claim 6 wherein said high-pressure mixing device defines a first planar surface and a second planar surface such that said first seal slidably engages said first planar surface and said second seal slidably engages said second planar surface when said high-pressure mixing device is moved between said application disposition and said purging disposition.

8. An air purging apparatus as set forth in claim 5 wherein said remote-controlled apparatus further includes:
 a first compression spring disposed between said first coupling and said first movable seal for urging said first seal axially towards said first inlet;
 a second compression spring disposed between said second coupling and said second movable seal for urging said second seal axially towards said second inlet.

9. An air purging coater apparatus for purging mixed components from the apparatus disposed in a pipeline at a pipeline site, said apparatus comprising:
- a remote-controlled apparatus for insertion within the pipeline at the pipeline site;
- said remote-controlled apparatus including:
- a drive for controllably moving said remote-controlled apparatus internally within the pipeline;
- a high-pressure mixing device in the range 1500-3500 psi defining a first inlet controllably connected to a pressurized source of a first component, said high-pressure mixing device also defining a second inlet controllably connected to a further pressurized source of a second component, said high-pressure mixing device defining a high pressure mixing chamber in the range 1500-3500 psi connected to said first and said second inlets for mixing together the first and second components, said high-pressure mixing device defining an outlet connected to said high pressure mixing chamber for receiving a flow therethrough of the mixed components;
- a spin head defining an internal conical surface having an apex which cooperates with said outlet for receiving the flow of the mixed components;
- said spin head including:
- a baffle disposed adjacent to said apex such that when said spin head is rotated, the mixed components are deflected by said baffle onto said internal conical surface so that the mixed components are applied to an inside surface of the pipeline at the pipeline site;
- said high-pressure mixing device being controllably movable from an application disposition thereof to a purging disposition, said application disposition being such that said first inlet and said second inlet are aligned with and in fluid communication with the respective pressurized source and further pressurized source so that the mixed components are applied to the inside surface of the pipeline, and when said high-pressure mixing device is controllably moved to said purging disposition, said first and second inlets are moved out of alignment with said pressurized sources so that the flow of the mixed components is ten iinated and a source of pressurized air flows into and through said first and second inlets and from said inlets through said high-pressure mixing chamber and through said outlet for purging any residual mixed components from said high-pressure mixing device thereby avoiding any need for the use of a potentially hazardous solvent together with life threatening conditions that could result from the introduction of such solvent into the pipeline at the pipeline site;
- a housing having a forward extremity and a rearward extremity, said housing defining a bore which extends from said forward extremity to said rearward extremity for permitting a slidable reception therein of said high-pressure mixing device; and
- said housing defines a cross bore disposed normal to said bore, said cross bore having a first side and a second side, said bore being disposed between said first and second sides of said cross bore such that when said high-pressure mixing device is in said application disposition and said purging disposition, said inlets are disposed within said cross bore.

10. An air purging coater apparatus for purging mixed components from the apparatus disposed in a pipeline at a pipeline site, said apparatus comprising:
- a remote-controlled apparatus for insertion within the pipeline at the pipeline site;
- said remote-controlled apparatus including:
- a drive for controllably moving said remote-controlled apparatus internally within the pipeline;
- a high-pressure mixing device in the range 1500-3500 psi defining a first inlet controllably connected to a pressurized source of a first component, said high-pressure mixing device also defining a second inlet controllably connected to a further pressurized source of a second component, said high-pressure mixing device defining a high pressure mixing chamber in the range 1500-3500 psi connected to said first and said second inlets for mixing together the first and second components, said high-pressure mixing device defining an outlet connected to said high pressure mixing chamber for receiving a flow therethrough of the mixed components;
- a spin head defining an internal conical surface having an apex which cooperates with said outlet for receiving the flow of the mixed components;
- said spin head including:
- a baffle disposed adjacent to said apex such that when said spin head is rotated, the mixed components are deflected by said baffle onto said internal conical surface so that the mixed components are applied to an inside surface of the pipeline at the pipeline site;
- said high-pressure mixing device being controllably movable from an application disposition thereof to a purging disposition, said application disposition being such that said first inlet and said second inlet are aligned with and in fluid communication with the respective pressurized source and further pressurized source, the mixed components are applied to the inside surface of the pipeline, and when said high-pressure mixing device is controllably moved to said purging disposition, said first and second inlets are moved out of alignment with said pressurized sources so that the flow of the mixed components is terminated and a source of pressurized air flows into and through said first and second inlets to and from said inlets through said high-pressure mixing chamber and through said outlet for purging any residual mixed components from said high-pressure mixing device thereby avoiding any need for the use of potentially hazardous solvents together with life threatening conditions that could result from the introduction of such solvents into the pipeline at the pipeline site;
- said drive selectively moving the remote-controlled apparatus along the pipeline in a forward direction and a reverse direction;
- said remote-controlled apparatus further including:
- a housing having a forward extremity and a rearward extremity, said housing defining a bore which extends from said forward extremity to said rearward extremity for permitting a slidable reception therein of said high-pressure mixing device;
- said housing defines a cross bore disposed normal to said bore, said cross bore having a first side and a second side, said bore being disposed between said first and second sides of said cross bore such that when said high-pressure mixing device is in said application disposition and said purging disposition, said inlets are disposed within said cross bore;
- a first coupling secured to said housing adjacent to said cross bore;
- a second coupling secured to said housing adjacent to said cross bore such that said high- pressure mixing device and said cross bore are disposed between said first and second couplings;

a first seal movably secured to said first coupling and disposed within said cross bore between said first coupling and said first inlet;

a second seal movably secured to said second coupling and disposed within said cross bore between said second coupling and said second inlet such that when said high-pressure mixing device is in said application disposition, the first component flows through said first coupling then through said first seal into said first inlet and the second component flows through said second coupling then through said second seal into said second inlet;

said first seal is movably urged axially relative to said first inlet into sealing engagement with said high-pressure mixing device and said aligned first inlet;

said second seal is movably urged axially relative to said second inlet into sealing engagement with said high-pressure mixing device and said aligned second inlet;

said high-pressure mixing device defines a first planar surface and a second planar surface such that said first seal slidably engages said first planar surface and said second seal slidably engages said second planar surface when said high-pressure mixing device is moved between said application disposition and said purging disposition;

a first compression spring disposed between said first coupling and said first movable seal for urging said first seal axially towards said first inlet; and a second compression spring disposed between said second coupling and said second movable seal for urging said second seal axially towards said second inlet.

* * * * *

UNITED STATES PATENT AND TRADEMARK OFFICE
CERTIFICATE OF CORRECTION

| | |
|---|---|
| PATENT NO. | : 11,607,705 B2 |
| APPLICATION NO. | : 16/930618 |
| DATED | : March 21, 2023 |
| INVENTOR(S) | : Michael Kronz |

It is certified that error appears in the above-identified patent and that said Letters Patent is hereby corrected as shown below:

In the Claims

In Claim 9 on Column 11, Line 41 "ten iinated" should be deleted and --terminated-- inserted therefore.

Signed and Sealed this
Third Day of September, 2024

Katherine Kelly Vidal
*Director of the United States Patent and Trademark Office*